United States Patent [19]

Peil et al.

[11] Patent Number: 4,464,607
[45] Date of Patent: Aug. 7, 1984

[54] LIGHTING UNIT

[75] Inventors: William Peil, North Syracuse; Thomas A. Brown, Fulton; James E. Harris, Liverpool, all of N.Y.

[73] Assignee: General Electric Company, Schenectady, N.Y.

[21] Appl. No.: 305,653

[22] Filed: Sep. 25, 1981

[51] Int. Cl.³ .................. H05B 37/02; H05B 39/04; H05B 41/36

[52] U.S. Cl. .................. 315/209 R; 315/DIG. 5; 315/DIG. 7; 315/92

[58] Field of Search .................. 315/DIG. 5, DIG. 7, 315/46, 49, 91, 92, 93

[56] References Cited

U.S. PATENT DOCUMENTS

| | | | |
|---|---|---|---|
| 3,659,146 | 4/1972 | Munson | 315/92 |
| 4,151,445 | 4/1979 | Davenport et al. | 315/92 |
| 4,232,252 | 11/1980 | Peil | 315/91 |
| 4,320,325 | 3/1982 | Anderson | 315/DIG. 7 |
| 4,350,930 | 9/1982 | Peil et al. | 315/DIG. 7 |
| 4,358,717 | 11/1982 | Elliot | 315/49 |
| 4,392,081 | 7/1983 | Brown et al. | 315/92 |
| 4,399,392 | 8/1983 | Buhrer | 315/92 |

Primary Examiner—Saxfield Chatmon
Attorney, Agent, or Firm—John P. McMahon; Richard V. Lang; Philip L. Schlamp

[57] ABSTRACT

An energy efficient lighting unit is described designed for functional similarity to the incandescent light used in the home. The light unit utilizes a metal vapor arc lamp as the main source of light supplemented by a standby filamentary light source. The lighting unit includes means for converting 60 hertz ac to dc, and a dc energized operating network comprising an inverter operating at above audible frequencies (e.g. 30–40 KHz). The operating network produces a sequence for the arc lamp and the standby filamentary light source appropriate to each operating state of the arc lamp.

19 Claims, 3 Drawing Figures

| STATE OF LIGHTING UNIT | PREIGNITION | | IGNITION | "GAT" BOOST | WARM UP | FINAL RUN |
|---|---|---|---|---|---|---|
| | SCR ON OSC OFF | SCR OFF OSC ON | | | | |
| DURATION | (0 SEC MIN. — 8 SEC | 1 MIN. MAX.) 8 MSEC | 1 μSEC MIN. 2 SECOND MAX. | 0.1-4 SECONDS | 30-90 SECONDS | — |
| POWER INPUT | 75 WATTS | 60 WATTS | 60 WATTS | 65 WATTS | 70-50 WATTS | 50 WATTS |
| ARC LAMP (11) | — | 2500V P-P AT ~40 KHz | 2500V P-P AT ~40 KHz | 500-150V P-P MAX. AT ~35 KHz | 15-85 VDC | 86 VDC |
| | — | 0 DISSIPATION | SMALL DISSIPATION | 2-8 WATTS DISSIPATION | 10-27 WATTS | 27 WATTS |
| | 0 LUMENS | 0 LUMENS | NEGLIGIBLE LUMENS | LOW LUMENS | INCREASES TO FINAL LUMENS | 2000 LUMENS |
| FILAMENTARY RESISTANCE (12) | DC WITH 120 Hz RIPPLE | 40 KHz PULSATING | 40 KHz PULSATING | 35 KHz PULSATING | DC WITH 120 Hz RIPPLE | DC WITH 120 Hz RIPPLE |
| | ~70 WATTS | ~56 WATTS | ~56 WATTS | ~56 WATTS | ~55-20 WATTS | 20 WATTS |
| | ~1100 LUMENS | ~800 LUMENS | ~800 LUMENS | ~800 LUMENS | ~800 LUMENS TO MIN. | MIN. LUMENS |
| | | | PHASE I IONIZATION GLOW ESTABLISHED | PHASE II THERMIONIC EMISSION ARC ESTABLISHED | | PHASE III FULL TEMPERATURE AND PRESSURE |

LIGHTING UNIT

RELATED PATENTS AND APPLICATIONS

U.S. Pat. No. 4,161,672, Cap and Lake, entitled "High Pressure Metal Vapor Discharge Lamps of Improved Efficacy".

Application of Peil and McFadyen, entitled "A Transformer for Use in a Static Inverter", Ser. No. 139,946, filed Apr. 16, 1980 (continuation-in-part of Ser. No. 969,181, filed Dec. 14, 1978, now abandoned).

Application of Peil and McFadyen entitled "Lighting Unit", Ser. No. 156,229, filed June 4, 1981 (continuation-in-part of Ser. No. 47,972, filed June 13, 1979, now abandoned).

BACKGROUND OF THE INVENTION

1. Field of the Invention

The present invention deals with a lighting unit designed for functional similarity to an incandescent light source in which the principal source of light is an arc lamp supplemented by a standby filamentary light source, and which includes a compact "high frequency" power supply unit operating from a conventional 110 volt 60 hertz source.

More particularly, the present invention deals with measures designed to increase the level of standby illumination and to reduce the amount of electromagnetic interference during attempts to ignite the arc lamp.

2. Description of the Prior Art

The present invention is a product of efforts to produce an energy efficient and comparatively low cost replacement unit for the incandescent lamp. The incandescent lamp converts most of the electrical energy supplied into heat with only a small percentage, usually less than 10% being converted into visible light. With the cost of energy rising, a need has arisen for a lighting unit which converts electrical energy into light with greater efficiency. Recently, as disclosed in U.S. Pat. No. 4,161,672, smaller, low wattage, metal halide lamps having high efficiencies and light outputs comparable to home incandescent lamps have been invented. Such lamps are potential energy efficiency replacements for the home sized incandescent lamp provided that convenient low cost provisions can be made for standby illumination and for supplying the diverse electrical requirements for the two light sources.

The power supply of the present lighting unit represents an outgrowth of earlier high frequency power supplies in which a ferrite transformer, normally controlled for non-saturated operation and a transistor switch are significant elements. Such a power supply is disclosed in the application Ser. No. 156,229.

The foregoing power supply produces sustained high frequency energy starting with the high voltage ignition potentials for initiating the arc, continuing through the glow to arc transition when significant power at relatively low voltages is required by metal vapor lamps and terminating when the arc has stabilized at a low voltage signalling the initiation of "warm-up" and the onset of dc operation. Prior to warm-up, the high frequency energy is used both for the arc lamp and for energizing the filament providing standby illumination. In the normal start, the time that high frequency energy is requred for the arc lamp can be as short as one-tenth of a second and rarely longer than several seconds. At the same time, the circuit provides approximately 800 lumens of standby illumination. In the event that the arc lamp loses ignition in a hot condition requiring a "hot restart", then sustained high frequency application may continue for several minutes. However, should the arc lamp fail and refuse to ignite, the circuit would remain in the "pre-ignition" condition until a fuse or some other means terminates high frequency operation. Ideally, in the interests of minimal electromagnetic interference, the duration of the application of high frequency energy should be minimal under both circumstances. Standby illumination during the starting procedure should preferably be more nearly comparable to eventual illumination levels of the arc lamp, but must generally be compromised with the heat dissipation limits of the unit.

SUMMARY OF THE INVENTION

Accordingly, it is an object of the invention to provide an improved lighting unit utilizing an arc lamp.

It is another object of the invention to provide an improved lighting unit wherein the main source of light is an arc discharge lamp supplemented by a filamentary light source controlled in an advantageous fashion.

It is still another object of the invention to provide an improved lighting unit in which electromagnetic interference is minimized during starting, restarting, or in the event of failure of the arc lamp.

It is yet another object of the invention to provide an improved lighting unit combining a main arc discharge lamp with a standby filamentary light source in which standby illumination is increased during a portion of the starting procedure.

These and other objects of the present invention are achieved in a lighting unit comprising a dc power source, a metal vapor arc lamp, and a lamp condition response operating network. The operating network comprises an incandescible resistive filament for ballasting the lamp and for standby lighting, alternating electrical energy transforming means for coupling a stepped-up output voltage to the lamp, and switching means. Means are provided for interconnecting the elements of the operating network for coupling current from the dc source to the filament and to the lamp in several forms. Until lamp conduction has begun, current is coupled in a dc form to the filament for producing useful light alternately with current in a periodic form to the input of the transforming means for starting the lamp. After lamp conduction until warm-up, current is coupled in a sustained periodic form to the filament for producing useful light and in a sustained periodic form to the input of the transforming means for transitioning of the lamp. During warm-up and normal running operation of the lamp, current is coupled in a dc form to the filament and the lamp in series for energizing and ballasting the lamp. During normal running operation of the lamp, dissipation in the filament is too low to produce useful light.

Preferably, prior to lamp conduction, the dc current is provided to the filament for a relatively long period and the periodic current is provided to the input of the transforming means for a relatively short period. Typical periods are 8 seconds for the dc current and 8 milliseconds for the periodic current.

More particularly, the "switching means" comprises a silicon controlled rectifier. series connected with the filament across the output terminals of the dc source, and a second switching means comprising a transistor having a stable nonconducting first condition and an astable conducting-nonconducting second condition.

In addition, control means are provided for precluding the astable condition of the second switching means when the first switching means is ON and for permitting the astable condition of the second switching means when the first switching means is OFF. Preferably, in the starting sequence, the first switching means becomes conductive before the astable condition of the second switching means.

In accordance with a further aspect of the invention, the control means further comprise means responsive to conduction of the lamp for holding off the first switching means after lamp conduction has begun. This current level is typically a few milliamperes. The control means further comprises means responsive to the electrical condition of the lamp for controlling the condition of the second switching means. The control means maintains the second switching means in an astable condition during the OFF condition of the first switching means when the lamp is nonconductive; in a sustained astable condition after lamp conduction until warm-up; and in the stable condition during warm-up and normal running operation of the lamp.

The timing of the ON and OFF times of the silicon controlled rectifier, which is used to establish the durations of dc energization of the filament and the application of periodic ignition potentials to the lamp during pre-ignition, respectively, is provided by a sawtooth oscillator. The sawtooth oscillator comprises a hook connected complementary transistor pair in combination with a capacitor and assorted components. The capacitor is recurrently charged at a slow rate through a large resistance and then discharged rapidly by conduction of the hook circuit. The discharge of the hook circuit occurs when the Zener voltage established by the reversed input junction of the transistor and applied to the base of the second transistor is sufficiently exceeded by the voltage at the emitter of the second transistor. The emitter of the second transistor is coupled to the capacitor whose voltage is increasing as it is charged. Conduction of the hook circuit occurs with the occurrence of a forward-bias at the input junction of the second transistor. Discharge of the capacitor is used to turn off the SCR and initiate astable operation of a transistor which is a part of the second switching means.

The circuit time constants are arranged so that in the period prior to arc lamp conduction, the conducting interval of the SCR occurs before the astable operation of the transistor switch. After arc lamp conduction, the status of the transistor switch is a function of the arc lamp current and voltage as sensed in the operating network. Astable operation discontinues when the arc lamp enters its warm-up state.

The effect of a long period of dc operation prior to arc lamp conduction (alternating with shortened periods of high frequency operation) increases the average level of standby illumination typically to 1100 lumens, for the 8 seconds before ignition occurs. If ignition occurs in the following 8 milliseconds of high frequency operation, which is normal, standby illumination continues for several more seconds at 800 lumens. The shortened period of high frequency operation reduces the ON time when emi is occurring by a factor of 1000 without significantly increasing the elapsed time required to ignite the arc lamp. During a hot restart, or in the event of arc lamp failure, the percentage of ON time remains equally small. When emi is detectable as an audible effect, each shortened period is heard as a short "blip" followed by several seconds of silence until the next period. The interference is significantly less objectionable than continuous high frequency operation. Throughout these longer periods, the filament operates at the higher light level.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings in which:

DESCRIPTION OF PREFERRED EMBODIMENT

Figure 1:
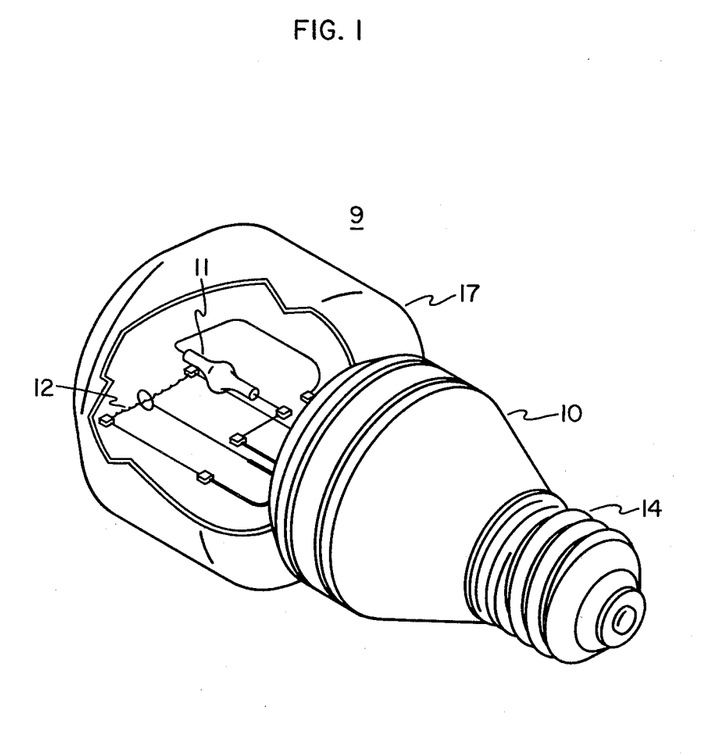
FIG. 1 is an illustration of a novel lighting unit suitable for connection to a standard lamp socket using an arc lamp as the principal light source, a standby light source and a compact power supply unit.

Referring now to FIG. 1 an efficient lighting unit for operating an arc lamp from a conventional low frequency (50–60 Hz) alternating current power source is shown. The present invention represents a modification of the lighting unit described in U.S. patent application, Ser. No. 156,229, filed June 4, 1980. The modification, which primarily affects the starting operation, herein disclosed, is designed to reduce electromagnetic interference and to provide increased reliability over the cited lighting unit. The lighting unit comprises a lamp assembly which produces light, and a power supply unit which supplies electrical power to the lamp assembly, with certain elements of the lighting unit having dual light production and ballasting functions. The lamp assembly includes a glass enclosure 9 which contains a high efficiency arc lamp 11 and a filamentary resistance element 12. The resistance element 12 is both a ballast to the arc lamp and a supplemental light source. The power supply unit includes a rigid case 10 attaching the glass enclosure 9 to a screw-in base 14. The base 14 provides electrical connection and mechanical attachment of the lighting unit to a conventional ac lamp outlet. The unit develops the required energization for the arc lamp during starting and operating conditions, and produces instant illumination by use of the supplemental light source.

In accordance with the invention, novel means are provided which establish a short duty cycle, in application of the ignition potential, to the arc lamp.

The novel lighting unit, as seen in FIG. 1, has the dimensional convenience of an incandescent lamp. The power supply unit occupies the space between the screw-in base 14 and the lamp assembly.

The lighting unit may be switched on, restarted, or turned off with the same convenience as an incandescent lamp. The delays in production of light normally attendant upon the starting of an arc lamp have been made less objectionable by the use of the supplemental incandescent element 12, packaged within the enclosure 9. This feature is of particular interest for the half minute periods that it may take for the arc lamp to reach full brightness after a cold start or the longer periods required for a hot restart.

The arc lamp 11 is shown in FIG. 1 with the positive electrode or anode down (next to the base) and the negative electrode or cathode up (remote from the base). The two electrodes are in turn sealed into the ends of a small quartz vessel whose outer contour is cylindrical except for a small central region of larger cross section, of less than ½" in diameter. The interior of the arc lamp, which is not specifically illustrated, contains a spherical or elliptical central chamber filled with an ionizable mixture argon, an ionizable starting gas, mercury, which is vaporized when hot, and a vaporizable metal salt such as sodium and scandium iodides. When operating, an arc is formed between the electrodes which creates illumination throughout the chamber. Small, low power lamps of the type just described are referred to as metal halide or metal vapor lamps. A suitable lamp is more fully described in the earlier cited U.S. Pat. No. 4,161,672.

Light production is shared between the arc lamp 11 and the filamentary resistance 12, with the latter also providing resistive ballasting for the arc lamp. In normal "final run" operation, the filamentary resistance 12 conducts the current flowing in the arc lamp but primary light generation occurs in the arc lamp. In starting or restarting the arc lamp, the filamentary resistance (12) produces supplementary illumination.

The arc lamp exhibits several distinct states in conventional use and each active state requires distinct energization. From a practical viewpoint, the arc lamp has three essentially active states denominated Phases I–III and an inactive state.

In Phase I, "ignition" occurs. The duration of ignition is normally no longer than a second or two and can be made to be less than 8 milliseconds in the usual case by design. It is the time required for a suitably high voltage to cause "electrical breakdown" of the gas contained in the arc lamp initiating a falling maximum lamp voltage. This latter condition is also referred to as the establishment of a "glow discharge". (For purposes of definition, ignition is to be distinguished from pre-ignition. Pre-ignition is an interval preceding ignition, whose duration is predictable for a given discharge lamp and power supply unit, and is the period during which ignition is improbable, normally due to non-optimum physical conditions in the lamp. (Pre-ignition will be discussed later.)

When ignition takes place, the arc discharge lamp will break down at the 1000–2500 volt ignition voltage, causing a sudden drop in lamp voltage to typically 15 volts and then the lamp may re-fire a second time, generally at a lesser voltage as the ionization level of the contained gases increases and entrance is made to the "glow to arc transition". In Phase I, lamps of the design herein contemplated require 1000 to 2500 volts using pulses of microsecond duration during an approximately 8 millisecond pulsing interval.

Phase II—the glow to arc transition—extends from one-tenth of a second to perhaps four seconds and is characterized by a more sustained ionization level and a lower maximum voltage. As Phase II begins, the discharge is typically unstable, swinging between a maximum and a minimum value, with the voltage of the discharge falling continually toward a lower maximum with a recurring minimum near 15 volts. As the average level of gas conduction increases, the maximum lamp voltage falls, the consumed power increases, and the temperatures inside the lamp also increase. As the maximum arc voltage falls through values near 500–150 volts, a more substantial energy (typically 2–8 watts) is required by a metal vapor lamp.

Phase III begins with the establishment of the "arc", which occurs when a portion of the cathode has reached thermionic emission temperatures, and the disappearance of electronic noise. At the (usually) marked transition from Phase II to Phase III, the voltage of the discharge loses its unstable quality and holds to an initial value of about 15 volts. In Phase III, a sustained low lamp impedance is exhibited, which is positive resistive short term (microseconds), and negative resistive long term (milliseconds). A current limiting ballast is required to prevent excessive heating and destruction.

The warm-up period, which is the initial portion of Phase III, normally lasts from 30–90 seconds. During the warm-up period, the lamp reaches full operating temperature and the contained gases reach their high, final operating pressures. The voltage across the lamp increases to a value of typically 86 volts with a accompanying reduction in lamp conductance. When the final run condition occurs, the lamp absorbs maximum power (typically 27 watts) and the maximum light output is produced.

The pre-ignition period is a variable period having a nominal minimum value of zero at standing ambient conditions and a maximum value of approximately 1 or 2 minutes if there has been an interruption of the arc and a hot restart is required. If the lamp is de-energized in the course of normal operation, the lamp will be at elevated temperature and at a high gas pressure for a short while. To restrike the arc when the lamp is hot, the potential required may be an order of magnitude more than that for a cold start (e.g., 10–30 KV). The thermal time constants of the lamp set the time required for cooling from a hot operating condition to the point where a conventional voltage will restrike the arc.

Supplemental illumination is particularly important to the user during warm-up and the pre-ignition period for a hot restart, and it is provided throughout both the normal starting procedure and hot restarting. During warm-up, the supplemental illumination gradually diminishes to accommodate the increasing light output of the arc lamp. In the final run condition, no supplemental illumination is provided.

Figure 2:
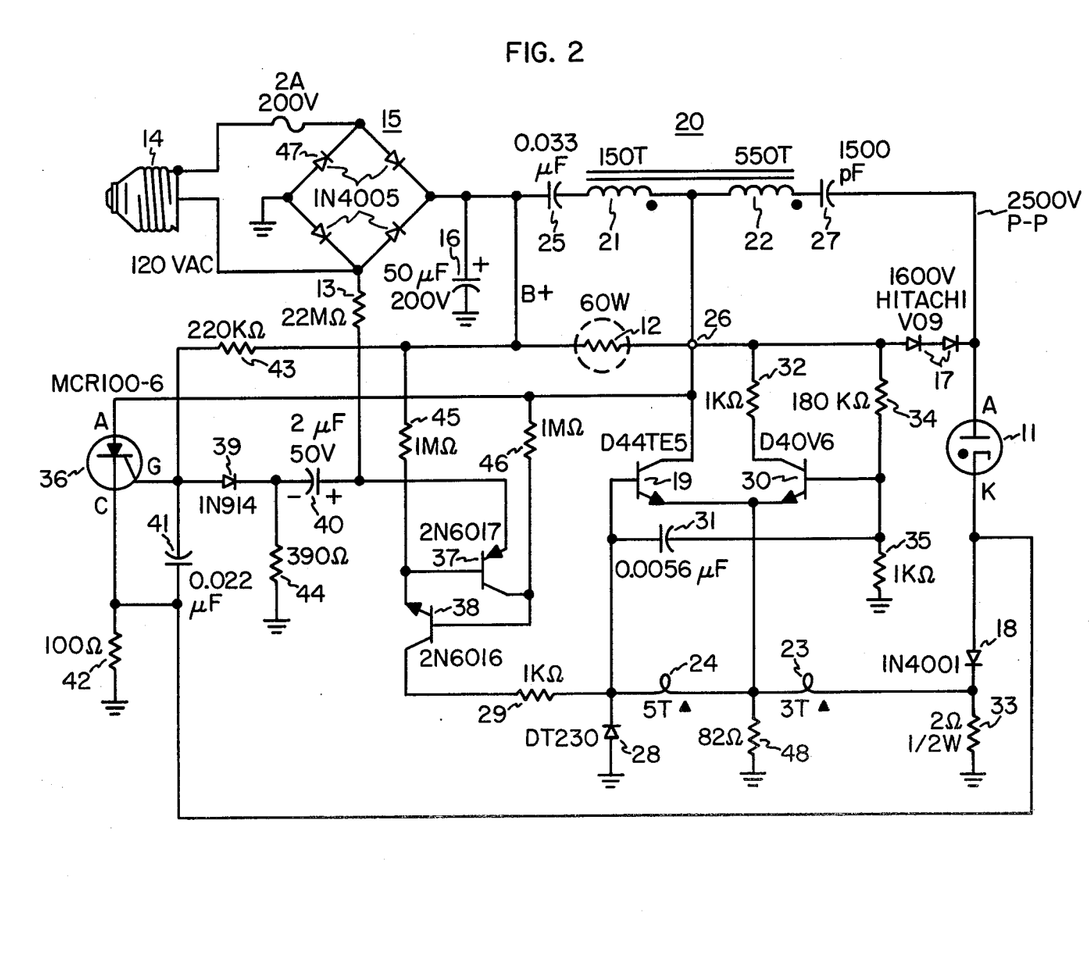
FIG. 2 is an electrical circuit diagram of the lighting unit.

Suitable operating power for the arc lamp and the standby light producing filament is provided by the power supply illustrated in FIG. 2. When the arc lamp is in the final run condition, the supply provides dc energy at approximately 145 volts with resistive ballasting. The ballasting reduces the voltage at the lamp to 86 volts, and maintains the arc lamp operating power at 27 watts. During this period current flowing through the filament 12, acting as a ballast, is sufficient to hold it in an elevated temperature but insufficient to produce useful light in the filament.

In pre-ignition, the power supply produces a succession of high frequency unidirectional pulses with a high frequency (40 KHz) alternating component. The alternating component, transformed and rectified, is applied to the arc lamp for ignition. This results in a dc restored waveform having a peak amplitude of about 2500 volts at a relatively low power level. During pre-ignition, the pulses are produced in a short period, typically of 8 milliseconds duration and at 8 second intervals. With lamp ignition, the high frequency pulses become continuous, leading to the glow to arc transition where significant power is required by the arc lamp.

Meanwhile, during pre-ignition and ignition of the arc lamp, the filament 12 is also receiving powe and supplying standby illumination. When the unidirectional pulses are in the OFF condition during pre-ignition, an auxiliary current path is completed, which applies substantially full dc power (70 watts) to the filamentary resistance. The filamentary light output thus commences at about 1100 lumens and in a quick transition will appear to hold this value until warm-up of the arc lamp. During the pulses, in both pre-ignition and ignition, significant hf power (56 watts) is also applied to the filament to provide continuous standby illumination at a somewhat lower level until the transition of the arc lamp to warm-up is completed.

In the glow to arc transition, high frequency energy provide standby illumination, while the high frequency power available for the arc lamp, as it crosses through a 400-200 volts level, increases to a maximum value, typically 8 watts. This increase in available power for the arc lamp is achieved by a reduction to 35 KHz in the pulse repetition rate as the lamp condition affects the loading on the power supply. The increase in available power insures a reliable transition of the high pressure metal vapor lamp to warm-up operation.

When warm-up occurs, high frequency operation of the power supply unit ends and the power supply now produces a dc output, subject to 120 Hz ripple, applied to the arc lamp and the filamentary resistance in series. The role of the filamentary resistance at the beginning of warm-up is a joint one, producing a substantially full light output while also ballasting the arc lamp. Ballasting holds the initial dissipation in the arc lamp to about 10 watts as the arc voltage falls to about 15 volts. As warm-up continues, the filamentary resistance serves as a low dissipation ballast whose negligible value as the light produced by the arc lamp increases.

Figure 3:
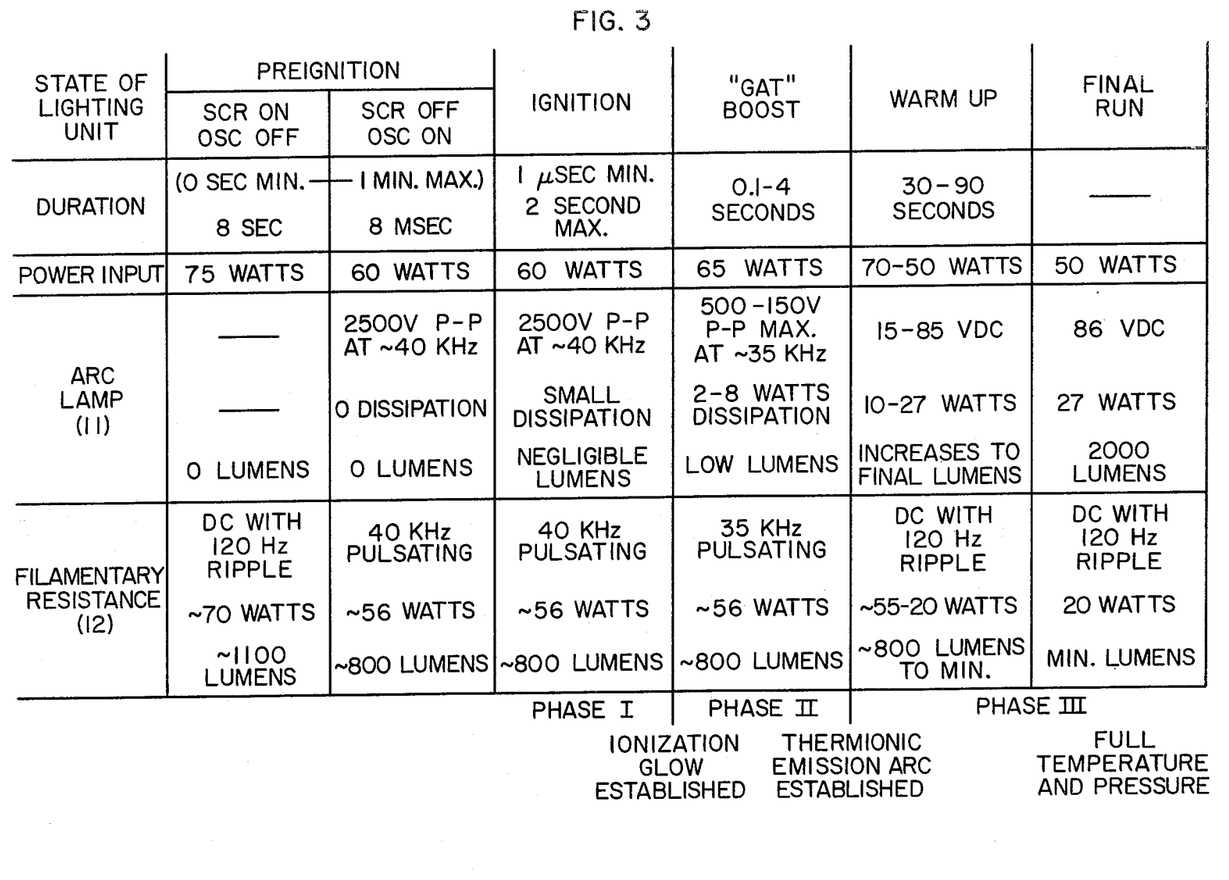
FIG. 3 is a table of the six states of the lighting unit in a normal lighting sequence listing the conditions of the arc lamp and the standby filamentary resistance, and the corresponding energization requirements.

The lighting unit whose electrical circuit diagram is illustrated in FIG. 2 has as its principal components the arc lamp 11, a dc power supply (14, 15, 16) for converting the 120 volt 60 Hz to dc, an operating network (17-45) for converting electrical energy supplied by the dc power supply into the form required for operation of the lamp assembly and finally a filamentary resistance (12) which performs a ballasting function in the operating network and provides standby light. The light unit has six active conditions characterized by the states of the discharge lamp, the standby light source, and the operating network. These states, which summarize the preceding discussions, are illustrated in FIG. 3.

The dc power supply circuit of the lighting units is conventional. Energy is supplied from a 120 volt 60 hertz ac source via the plug 14 and two input connections to the ac input terminals of a full wave rectifier bridge 15. The positive output terminal of the bridge becomes the positive output terminal of the dc supply and the negative output terminal of the bridge becomes the common or reference output terminal of the dc supply. The filter capacitor 16 is connected across the output terminals of the dc supply to reduce ac ripple. The output of the dc supply during normal run operation of the arc lamp 11 is 145 volts at about ⅓ amperes current, producing an output power of approximately 48 watts of which 27 watts is expended in the lamp. The power required of the dc power supply by the lighting unit during a hot restart is approximately 73 watts and the maximum required during warm-up of the arc discharge lamp is approximately 68 watts.

The operating network which derives its power from the dc supply, and in turn supplies energy to the lamp assembly, comprises the elements 17-48 connected together as follows: the filamentary resistance 12, diode 17, arc lamp 11, diode 18 and lamp current sensing resistance 33 are serially connected in the order recited between the positive terminal and the common terminal of the dc supply.) The diode 17, which is poled for easy current flow from the dc source to the arc lamp, has its anode coupled to an interconnection terminal (or node) 26 and its cathode coupled to one terminal of the arc lamp 11. The arc lamp, which has a required polarization, has its anode coupled to the cathode of the diode 17 and its cathode coupled to the anode of diode 18, the cathode of which is coupled to one terminal of the current sensing resistance 33. In this application, the diode 17 is in fact two series connected devices for reliable high voltage performance.

Continuing with a description of the operating network, a triggered monostable solid state switch is provided, constituted in part by a power transistor 19, a step-up transformer 20, and passive component 28. The power transistor has base, emitter and collector electrodes. The step-up transformer 20 has a ferrite core for high frequency operation (>20 KHz), a main primary winding 21, a main second winding 22, a primary control winding 23 and a secondary control winding 24, all associated with the core. The control windings provide a transistor conduction control whose sense is responsive to the magnetic state of the ferrite core and produce monostable action, avoiding full core saturation. The main primary winding 21 has its undotted terminal coupled through the capacitor 25 to the positive source terminal and its dotted terminal connected to the interconnection terminal 26 between filamentary resistance 12 and diode 17. The main second winding 22 of the transformer 20 has its undotted terminal connected to the terminal 26, and its dotted terminal connected through the capacitor 27 to the anode of the arc lamp 11. The emitter of the switching transistor 19 is coupled to the unmarked terminal of the primary control winding 23. The marked terminal of the primary control winding 23 is connected to the cathode of the diode 18, of which the anode is connected to the cathode of the arc lamp 11. The cathode of the arc lamp is serially connected through diode 18 and resistance 33 to the common dc terminal. The base of transistor 19 is coupled to the cathode of a clamping diode 28, whose anode is coupled to the common dc terminal. The secondary control winding 24 has its unmarked terminal coupled to the base of transistor 18 and its marked terminal connected to the emitter. The base of transistor 19 is the point for application of a trigger pulse for initiating each conduction cycle.

The transistor 30, with its associated components, forms a triggering oscillator for recurrently turning on the solid state switching transistor 19. The trigger oscillator is turned on and off and also shifted in frequency in response to electrical conditions attributable to the electrical state of the arc lamp. The transistor 30 has its emitter coupled to the emitter of transistor 19, its base coupled through the capacitor 31 to the base of transistor 19, and its collector connected through the resistance 32 to the interconnection terminal 26. A voltage sensing divider is provided consisting of resistance 34 connected between the anode of diode 17 and the base of transistor 30 and resistance 35 connected between the base of transistor 30 and the common dc terminal. During warm-up and final run operation, both of which are dc states of the lighting unit, the diode 17 is forward biased, and the divider output voltage, at the base of transistor 30, is proportional to the lamp voltage. During the high frequency states of the lighting unit, the diode 17 is reversely biased and non-conductive during those high frequency half-cycles when current is delivered to the lamp, so that the voltage on the voltage divider reflects the loading effect of the arc lamp upon the transformer circuit and is an indirect measure of the lamp voltage. The connection of the emitter of transistor 30 to the non-referenced terminal of the resistor 33 in series with the arc lamp 11, makes the trigger oscillator responsive to lamp current in the form of the voltage proportional to lamp current developed in resistance 33. The trigger oscillator is connected to respond in the manner noted above to the difference in those two sensed voltages.

The operating network is completed by circuitry which, during the pre-ignition period, imposes a short duty cycle upon oscillator operation. In the ON intervals of the oscillator, sequential pulses are applied to the arc lamp and ac excitation is applied to the filamentary resistance 12. In the OFF intervals of the oscillator, dc excitation is provided for the filamentary resistance. These conditions are illustrated in the chart of FIG. 3. The circuitry involved in producing duty cycled operation includes an SCR 36, a hook connected transistor pair 37, 38, diode 39, capacitors 40, 41, and resistances 13, 29 and 42-46. As will be seen, in the normal lamp starting sequence, conduction by the SCR 36 occurs first and continues for several seconds, providing filamentary energization and precluding oscillator operation. During non-conduction of the SCR, which continues for several milliseconds, the trigger oscillator functions, producing high frequency ignition potentials for the arc lamp and high frequency excitation of the filament. Timing of the conduction and non-conduction periods of the SCR 36 is achieved by a sawtooth oscillator utilizing the hook connected transistor pair 37, 38, capacitor 40 and other components.

The SCR 36 has its anode connected to the interconnection terminal 26 and its cathode connected to the cathode of the arc lamp 11, the latter serially connected through elements 18 and 33 to the common dc terminal. The cathode of the SCR 36 is also connected through resistance 42 to the common dc terminal. The gate of the SCR is connected through resistance 43 to the positive output terminal of the dc supply. A capacitor 41 is provided connected between the gate and the cathode of the SCR.

The hook connected transistor pair consists of the PNP transistor 37 at the input and the NPN transistor 38 at the output. The collector of transistor 37 is connected to the base of transistor 38, and the emitter of transistor 38 is connected to the base of transistor 37. The emitter of the input transistor 37 is connected through resistance 13 to an input terminal of the rectifier bridge 15. The emitter of 37 is also connected through serially connected capacitor 40 and diode 39 to the gate of the SCR 36. The anode of the diode 39 is connected to the SCR gate. A resistor 44 connects the cathode of diode 39 and one capacitor terminal to the common dc terminal. The base of transistor 37 is connected through resistance 45 to the positive dc output terminal and the base of transistor 38 is connected through resistance 46 to the interconnection terminal 26. The collector of output transistor 38 is connected through resistance 29 to the base of switching transistor 19.

The operating network, as earlier indicated, supplies the complex energy requirements of the lighting unit. The operating network acts in response to the sensed state of the main arc lamp and assumes the states summarized in the chart of FIG. 3. The final run state of the operating network will be taken up initially.

In the final run state of the lighting unit, the operating network provides direct current energization of the arc lamp with resistive ballasting; and monitors the current and voltage of the arc lamp to sense signs of incipient failure of the arc. The dc supply voltage has 15%-20% of 120 Hz ripple. During final run operation, the voltage of the arc is 86 volts with 27 watts being in the arc lamp and 20 watts being dissipated primarily in the filamentary resistance 12. The light output is 2000 lumens, approaching that produced by a 150 watt incandescent lamp. The current for the arc lamp supplied by the 145 volt dc source (14, 15, 16), flows through a serial path including the filamentary resistance 12, the diode 17, the lamp 11 itself, the diode 18, and current sensing resistance 33.

The operating point of the lamp, in the final run state, is determined primarily by the ballasting resistance 12, the properties of the arc lamp and the output voltage of the dc supply. The final running current (which is approximately one-third ampere) leaves the dissipation in resistance 12 less than in the arc lamp and too low to generate useful light.

Warm-up conditions of the arc lamp mark a distinct break with the preceding Phase II, but a gradual transition into final run conditions. In Phase II, (i.e., the glow to arc transition), ionization has been established but the average current, dissipation and light output of the lamp are low and the discharge unstable. With the beginning of warm-up, the discharge stabilizes, bringing about an increase in the average arc lamp current, dissipation and light output. The transition to the final run condition is smooth with the voltage gradually increasing from about 15 volts to the 86 volt final voltage, the power dissipation in the lamp gradually increasing from 10 to 27 watts and the light output, initially low, gradually increasing to the final value. Within the lamp during warm-up, the electrodes, the envelope and the contained gas reach their final operating temperatures and the gas pressure increases to the final value. Warm-up typically lasts from 30 to 45 seconds.

During warm-up, the operating network goes through gradual electrical change in response to current in the main lamp. Excessive dissipation in the main lamp is prevented and the standby illumination is transitioned from a maximum to a minimum light output as the main lamp illumination increases from a low to its final high value.

In pre-ignition, ignition and glow to arc transition, the transformer 20, the transistor switch 19 and the trigger oscillator (30, etc.) of the operating network assume an active role in generating a high frequency output. This is in contrast to the passive role played during warm-up and final run when the energization produced is primarily dc. The sharp change in high frequency electrical output occurring between the glow to arc transition and warm-up is in response to conditions in the main lamp. The changes in electrical output of the operating network between pre-ignition and ignition when the high frequency output is altered from a short duty cycle to continuous operation; and between ignition and the glow to arc transition when the operating frequency is reduced, are also in response to conditions in the main lamp.

As noted earlier, the short duty cycle (typically an ON time to OFF time ratio of 1 to 1000) is imposed upon the high frequency pulses. In pre-ignition, during the relatively long interval before the first high frequency pulse, and during the equally long intervals between the subsequent high frequency pulses, the SCR 36 is conductive and its conductivity provides a low impedance dc path for filament energization. At the same time, it clamps the voltage at node 26, precluding high frequency operation of the trigger oscillator or transistor switch. When the SCR becomes non-conductive, high frequency output takes place and is applied to both the arc lamp and the filament with the consequences shown in FIG. 3. Prior to a detailed discussion of duty cycling of the pre-ignition period, operation of the circuit will be discussed assuming nonconductivity on the part of the SCR and continuous high frequency operation.

In both duty cycled operation during pre-ignition and continuous operation during ignition of the glow to arc transition, the operating network produces high frequency electrical energization as a result of high frequency switching of the monostable transistor switch. Switching of the transistor switch produces ringing and an alternating current component in the main primary winding 21 of the step-up transformer 20, a stepped up alternating component in the transformer output and a pulsating current in the filamentary resistance 12 which is primarily unidirectional.

Alternating current flow in the main primary winding takes place in the following manner. Assuming that the transistor 19 has been turned on by a suitable trigger signal coupled to its input junction, a displacement current path is completed between the positive and common terminals of the dc supply. That path comprises in order the capacitor 25, the main primary winding 21, the NPN switching transistor 19 (collector and emitter electrodes, respectively), the primary feedback winding 23 and the current sensing resistance 33. The switching transistor presents a low impedance when conducting, and the capacitor 25, the primary feedback winding 23 and the resistance 33 are also low impedances. As the current in the circuit increases, the primary feedback winding 23, which is inductively coupled to the secondary feedback winding 24, produces regenerative feedback in the input circuit of the transistor and turns it on more strongly. Accordingly, when the transistor conducts, the current rapidly builds up in the transformer primary winding, limited primarily by the primary inductance. The current build-up continues, however, until a prescribed flux level is reached in the core of the power transformer. At that point, feedback is inverted to become degenerative, turning off the transistor 19 before full core saturation is reached. The discontinuance of conduction through transistor 19 opens the prior path for current flow through the primary winding and the capacitor 25 will resonate with the inductance of the winding 21. A portion of the energy stored in the circuit dissipates in the form of a reverse and then forward current through the filamentary resistance 12. Thus, the current flow, which was initially out of the dotted terminal of the primary winding when transistor 19 was conducting and shortly thereafter, reverses and the current now flows from capacitor 25 via filament 12 into the dotted terminal.

The transformed version of the high frequency alternating voltage appearing across the transformer primary winding appears at the terminal of the winding 22, remote from winding 21. The output is coupled from winding 22 by means of the capacitor 27 to the anode of the arc lamp 11. The output takes the form of unidirectional pulse-like energy by virtue of the presence of the diode 17 whose anode is coupled to the undotted terminal of the second winding and whose cathode is coupled to the anode of the arc lamp. The diode 17 is poled to permit application to the arc lamp of a stepped-up output voltage developed when the switching transistor turned off and to suppress application of the output voltage developed when the switching transistor is conducting.

In accordance with the invention, the application of the high pre-ignition voltage just discussed is held to a short interval preceded and followed by a relatively long interval of dc energization for the filament 12. A detailed discussion of duty cycled operation now follows.

Upon energization of the lighting unit, the first external circuit response is to turn on the standby filament at maximum brightness (1100 lumens) for an initial 8 seconds. This is accomplished by the circuitry which allows the SCR 36 to become conductive prior to the onset of high frequency operation, SCR conduction precluding high frequency operation until the SCR turns off 8 seconds later.

The turn-on of the SCR providing the initial dc filament energization occurs in the following manner. Upon application of ac potentials to the bridge 15, the capacitor 16 charges rapidly from the voltage developed at the output of the bridge. This dc voltage is applied through the filament 12 to the anode of the SCR 36 and through resistance 43 to the gate of the SCR where it causes the capacitor 41 to commence to charge positively. Since the cathode of the SCR is substantially at ground potential, being connected to ground through resistance 42 and as yet nonconductive, the capacitor 41 need only charge to a small voltage (+0.7 volts) to enable turn-on of the SCR. Actual turn-on of the SCR usually takes place after a delay of less than a millisecond after energization of the circuit.

Once the SCR is conducting, a current path is provided from the positive terminal of the dc supply, serially through the filament 12, the SCR 36 (anode and cathode), the diode 18 and the 2 ohm resistance 33 to the dc reference terminal. The circuitry provides a low impedance path for current through filament 12 and the filamentary resistance is designed to provide 70 watts of dissipation and 1100 lumens of illumination.

An SCR is a cost efficient choice in this application. Since the SCR conducts the first current through the filament 12, it is subject to the heavy initial current that brings the filament from a cold condition, where its resistance is low, to a substantially heated condition, where the filament resistance is high. When the rf excitation follows 8 seconds later, the filament is substantially heated and the resistance high. Allowing an SCR to conduct the first current through the filament rather than the switching transistor, permits one to use a lower rated switching transistor, while not requiring a particularly high rated SCR.

The circuit design insures that the SCR 36 is turned on before high frequency operation of the transistor switch can occur, and precludes further high frequency operation until it has turned off. The turn-on time of the SCR takes place under the primary control of the time constant set by resistor 43 and capacitor 41, which affects the gate potential. The potential turn-on of the trigger oscillator is likewise dependent upon the base potential of the transistor 30, coupled to the voltage divider 34, 35. The time constant in the oscillator base circuit is small and the base potential normally increases as a ratio of the voltage on the node 26. This ratio, assuming a zero emitter voltage, precludes the transistor from becoming conductive until the input junction is forward biased (e.g., 0.6 Volt), requiring the voltage on the node 26 to be in the vicinity of 100 volts. The prior turn-on of the SCR is normally assured by adjustment of the capacitor 41 and resistor 43. The indicated values are practical.

After the starting instant referred to earlier, the B+ voltage is climbing (approximately 1 volt per microsecond) as capacitor 16 is charging, and the voltage on the node 26, which provides energization to the transistor 30 is also climbing. Once the SCR 36 has turned on, however, a low impedance path is connected between the node 26 and reference potential, holding it to a few volts ($\sim$ +3 V) and precluding transistor 30 from becoming conductive.

Turn-off of the SCR occurs as a consequence of the timed turn-on of the PNP NPN hook connected transistor pair (37, 38) operating as a sawtooth oscillator. The base of input transistor 37 is connected in a circuit which, commencing at the positive terminal of the filter capacitor 16, includes resistance 45, (the base of 37), transistor 38, resistance 29, windings 24 and 23, and resistance 33 connected to the dc reference terminal. The emitter of transistor 37 is coupled to one terminal of the capacitor 40, which is connected in a charging path through a 22 megohm resistance 13 to the common terminal of the ac line at the input of the bridge 15, the charging path including resistance 44 and diode 47. The other terminal of the capacitor 40 is connected to ground through resistance 44 and through the diode 39 to the SCR gate, the latter at a relatively low positive potential (0.7 volts) when the SCR is conducting.

After the starting instant, capacitor 40 charges in alternate cycles of the ac supply. The charge increments are small due to the large value of resistance 13 and are in a sense to make the emitter potential of 37 more positive in response to the base. NPN transistor 38 in connected in an inverted mode with a reverse bias applied to its input junction. The Zener voltage of the reverse biased junction is used as a reference potential to determine the firing threshold of the hook circuit. The emitter connection of 38 through resistance 45 to the B+ terminal and the base connection of 38 through resistance 46 to the node 26 held near reference potential by SCR conduction, causes a reverse breakdown of the input junction of 38. The breakdown produces reverse "Zener" conduction at the microampere current level set by the resistances 45 and 46. This reverse leakage current allows the Zener breakdown potential to establish a potential at the base of transistor 37 in relation to node 26 and the dc reference potential. When the voltage on capacitor 40 at the emitter of transistor 37 becomes more positive by a diode drop than the voltage set at the base of transistor 37 (approximately 10 volts), the hook circuit becomes conductive, and switches sharply to a low impedance. The low impedance provides a path for current serially through transistors 37 and 38, transistor 38 providing base current for transistor 37 and transistor 37 providing base current for transistor 38. Conduction by the hook-connected transistor pair causes a fast discharge of capacitor 40 through a path including serially connected components 37, 38, 29, 23, 33, and 44.

The capacitor discharge produces a steep transient, turning on transistors 30 and 19, initiating operation of the high frequency circuit and terminating conduction by the SCR 36. The onset of conduction by transistor switch 19 is steep, aided by substantial regeneration causing a reduction in the current available for the anode of the SCR 36 to less than its holding current. At the same time that the SCR anode current is being reduced, the discharge of capacitor 40 through resistance 44 drives the cathode of diode 39 negative (typically $-3$ volts) with respect to the dc reference voltage, forward biasing diode 39, discharging capacitor 41 (in shunt with the gate of the SCR), backward biasing the gate, and withdrawing stored charge. The result is a turn-off of the SCR.

Resistor 48, illustrated in FIG. 3 connected from the junction of control windings 23 and 24 to the common dc terminal, is an optional component. Its function is to lengthen the initial ON time of switching transistor 19 to assist in turning off the SCR. When the SCR is conducting and before the hook circuit fires to initiate the astable operation interval for transistor 19, a portion of the SCR current is allowed to flow in a reverse direction through winding 23 and through resistor 48 to the common dc terminal. As a result, a remanent flux is established in the magnetic core which, for a given core size, extends the time before the flux reaches the level at which degenerative feedback is initiated to turn off transistor 19. This effectively extends the initial conduction period for the transistor and helps to assure reliable SCR turn-off.

The time interval that the SCR remains off after turn-off is approximately 8 milliseconds. It is approximately the time required to discharge capacitor 40 and to allow the SCR gate to again reach the turn-on threshold through charging capacitor 41. The SCR OFF time is controlled by both the elements in the earlier mentioned discharge path for capacitor 40 and also by the current through the resistance 43 and diode 39 from the B+ terminal of the capacitor 16. As earlier indicated, the OFF period of the SCR determines the duration of high frequency operation of the trigger oscillator 30 and transistor switch 19.

The SCR conduction period is set at approximately 8 seconds and is the time required to fire the hook connected transistor pair 37, 38. The values of capacitor 40 and resistance 13 establish the time constant of the hook emitter-connected capacitor charging circuit. The capacitor charging rate is also a function of the charging source potential. Obtaining a relatively long charging time (8 seconds) with practical values for capacitor 40 and resistance 13 is enhanced if a charging source of relatively low potential is available. This is accomplished by connection of resistance 13 to one of the ac supply terminals of the bridge 15. This provides a half-wave rectified sinousidal voltage from the ac line whose average value (54 volts) is considerably lower than alternate sources such as the dc output of the power supply. Also important in the timing of the SCR conduction is the Zener voltage of transistor 38 which establishes a reference potential to determine the firing threshold for the hook circuit. Control of the SCR ON time is effected by proper selection of the various parameters described above.

Operation of NPN transistor 38 in an inverted mode permits using its reverse-biased input junction to establish a reference potential. An additional benefit is the significant reduction of current gain compared to conventional operation. (For comparison, an NPN transistor useful in this operation may have a current gain of 10 in the inverted mode vs. 100 in the normal mode.) Excessive gain would tend to prolong hook circuit conduction at low current levels and could interfere with the preferred timing for turn-off of the hook circuit.

The SCR gate, initially held negative by the discharge of capacitor 40 through resistor 44, approaches its quiescent level near the end of the 8 millisecond interval. If the arc lamp does not break down, the quiescent gate potential established by current in resistor 43, diode 39, and resistor 44 is sufficient to turn on the SCR and start the next 8 second conduction cycle. If, however, the arc lamp breaks down as a result of the 8 millisecond high frequency interval, the SCR, already off, is held off by the arc current flowing in diode 18 and resistance 33 (typically 30–50 ma). This provides a positive potential on the cathode of SCR 36, in a proper sense, to reverse bias the SCR in an OFF condition. Thus, the lamp current flowing at the onset of arc breakdown provides a positive termination to the pre-ignition period.

With the SCR held off, the high frequency circuit now operates continuously through the balance of phase I and phase II. Repetition of the hook circuit discharge which initiated the 8 ms high frequency interval is undesirable after the preignition period. A hook circuit discharge during phase I or II could introduce a transient in the high frequency oscillations with an interruption in the normal transfer of energy required for transition of the arc lamp towards its final run condition. To avoid this possibility, the hook circuit is biased in a stable, non-oscillatory ON condition by the voltage at node 26 which provides base current to transistor 38 through resistor 46.

In phase III, the lamp transitions through a period of minimum voltage and maximum current; both of these conditions are sensed and used to apply reverse bias to the input of trigger transistor 30, thus preventing further high frequency oscillations. During the warm-up and final run states, the lamp is energized through the filamentary resistance, acting as a ballast, from the dc power supply only. In these states, retriggering of the high frequency oscillator by inadvertent firing of the hook circuit should also be avoided to prevent possible interruption of the arc. For this purpose, the stable ON state of the hook circuit is also assured by turning on hook transistor 38 from the node 26 voltage via resistor 46. During phase III, the voltage at node 26 is higher than the arc lamp voltage by a small amount, the drop across forward-biased diode 17. Reactivation of the hook circuit to its sawtooth oscillator function occurs in case of arc interruption when the lamp reverts to its pre-ignition state. The SCR is turned on to provide standby light from the filamentary resistance and the node 26 voltage is thus reduced to a low value near the dc reference level. This removes the bias from the base of transistor 38 and resets the hook circuit to its OFF condition to initiate the pre-ignition sawtooth oscillation cycle.

The duty cycling arrangement provides an effective "end of life" sequence for the lighting unit. As earlier indicated, duty cycling occurs during pre-ignition and is discontinued while high frequency operation continues through the GAT period. Assuming that the arc lamp has become defective, normally due to aging, the failure may preclude any conduction through the arc. This condition is recognized by the control circuit as a failure to start and high frequency operation will continue for the 8 seconds OFF and 8 milliseconds ON intervals. During this period, the filament 12 is illuminated and drawing the indicated power of 70 watts. Since the filamentary resistance is designed for only standby use, it may be chosen so that its lifetime in this mode is short. The arc lamp may also fail in a mode where the arc will transition to warm-up but because the electrodes have burned back, the filament will not supply adequate run voltage to maintain the arc. In this condition, the duty cycle will operate normally to start the lamp and then after perhaps 30–40 seconds, the lamp will go out and a hot restart will begin. The hot restart period is normally about a minute and is one in which the filament is continuously energized by its dc power through the SCR 36. The period prior to failure of the arc to sustain itself is one in which the filament is on for a relatively shorter time. In this failed mode, the actual duty cycle of the filament may be reduced to approximately half that with a full arc failure and accordingly the time before the filament burns itself out, doubles. As earlier noted, the emi interference produced when the arc lamp is starting, or in either failed condition, is a sequence of short blips spaced 8 seconds apart and therefore relatively unobjectionable to the user.

In addition to the advantage of emi reduction provided by using an 8 second OFF and 8 millisecond ON duty cycle for oscillations to start the lamp, an accompanying reduction in thermal stress on several components provides improved reliability. The components specifically benefited are those associated with the high frequency oscillation used to start the lamp, i.e. transformer 20, transistors 19 and 30, resistor 32, and diode 28. In an extended preignition period, such as a hot restart, these components are all subject to varying amounts of thermal stress due to internal power dissipation. With a duty cycle of 8 seconds OFF and 8 milliseconds ON for the high frequency oscillation, the average power dissipation for each of these components is reduced by a factor of 1000:1. In addition, the high voltages required for arc lamp ignition are only applied for the short 8 millisecond intervals. Long term component degradation due to sustained high voltage is thus reduced by shorter intervals of high voltage stress. This is of principal benefit to the transformer 20, diode 17, and to the circuit board substrate on which these components are mounted.

What is claimed is:
1. A lighting unit comprising:
A. a dc power source having two output terminals, one a reference terminal,
B. a metal vapor arc lamp requiring energization dependent on its electrical state, and
C. an operating network comprising:
  (1) an incandescible resistive filament exhibiting a substantial resistance increase with applied voltage to provide standby light for said lamp,
  (2) alternating electrical energy transforming means for coupling a stepped-up output voltage to said lamp,
  (3) first switching means,

(4) second switching means having a stable nonconducting first condition and an astable conducting-nonconducting, second condition, (5) interconnecting means for coupling current from said dc source,
  (a) in a dc form to said filament and said first switching means in series for producing useful light, alternately with current in a periodic form to the input of said transforming means for starting said lamp,
  (b) in a sustained periodic form to said filament for producing useful light and in a sustained periodic form to the input of said transforming means for transitioning said lamp, and
  (c) in a dc form to said filament and said lamp in series for energizing and ballasting said lamp, the dissipation in said filament being too low to produce useful light during normal running operation of said lamp, (6) control means comprising:
  (a) means for repetitively turning said first switching means on for a relatively long period and off for a relatively short period during starting or restarting of said lighting unit, the ON condition of said first switching means precluding and the OFF condition permitting said astable condition of said second switching means, and
  (b) means responsive to the electrical condition of said lamp, for maintaining
    (i) said first switching means OFF after said arc lamp becomes conductive, and
    (ii) said second switching means
      in an astable condition during said OFF condition of said first switching means when said lamp is non-conductive;
      in a sustained astable condition after lamp conduction until warm-up; and
      in said stable condition during warm-up and normal running operation of said lamp.

2. The lighting unit as set forth in claim 1 wherein the frequency of astable operation of said second switching means is above audible frequencies, and the OFF time of said first switching means is long enough for a high probability of starting the arc lamp.

3. The lighting unit as set forth in claim 2 wherein the OFF time of said first switching means is less than 20 milliseconds and the ON time of said first switching means is at least a second, to reduce objectionable emi consistent with prompt starting or restarting of the arc lamp.

4. The lighting unit as set forth in claim 3 wherein said first switching means is turned on prior to the astable condition of said second switching means during starting.

5. A lighting unit as set forth in claim 2 wherein said transforming means is a transformer having a primary winding, and
a second winding providing a stepped-up output voltage at one terminal thereof, the other terminal thereof being connected to said primary winding,
said operating network further comprising:
a first capacitor serially connected with said main primary winding,
said filament being connected in parallel with said serially connected first capacitor and primary winding, the parallel combination being connected in series with said first switching means across said dc source,
astable operation of said second switching means providing said periodic current in said filament and in said transformer input,
a second capacitor serially connected with said second winding,
a diode connected in the series path between said filament and said lamp and connected in parallel with said serially connected second capacitor and second winding, said diode being poled to permit dc current from said dc supply to said lamp when said second switching means is in said stable condition, and to rectify said stepped-up output voltage coupled to said lamp when said second switching means is in said astable condition.

6. A lighting unit as set forth in claim 5 wherein control of the condition of said second switching means is responsive to current and voltage conditions in said operating network dependent on the state of said lamp, the state of said first switching means, or said second switching means.

7. A lighting unit as set forth in claim 6 wherein one terminal of said filament, of said first switching means, of said second switching means, and of said diode are connected to a common node,
the voltage at said node being dependent on the voltage of said arc when said first and second switching means are nonconductive and also dependent on whether said first or second means are conductive, and
wherein the state of said second switching means is responsive to the voltage at said node, depression of the voltage by conduction of said first switching means precluding the astable condition of said second switching means.

8. A lighting unit as set forth in claim 6 wherein said current responsive input to said first and second switching means is connected to an impedance connected between said lamp and said reference terminal whereby current in said arc lamp is in a sense to inhibit turning on said first switching means and/or second switching means.

9. A lighting unit as set forth in claim 8 wherein said first switching means is connected to a sawtooth oscillator comprising:
  (a) a capacitor, and
  (b) a third switching means connected to said capacitor to permit charging of said capacitor when said third switching means is nonconductive, and discharging of said capacitor when said third switching means is conductive, the charging time being relatively long and discharging time relatively short, and
  (c) means coupling energy from the discharge of said capacitor to said first and second switching means to turn off said first switching means and initiate the astable condition of said second switching means.

10. A lighting unit as set forth in claim 9 wherein said first switching means is a silicon controlled rectifier, said second switching means is a bipolar transistor, and said third switching means is a hook connected transistor pair.

11. A lighting unit as set forth in claim 10 wherein said third switching means is a complementary hook connected transistor pair having a second and a third transistor, and wherein
  (a) one capacitor terminal is connected to said reference terminal through a low valued first resistance and the other capacitor terminal is connected through a high valued second resistance to a source of charging potential,
(b) the emitter electrode of said second transistor is coupled to said other capacitor terminal,
(c) the base electrode of said second transistor is coupled to the emitter of said third transistor and through a third resistance to the non-reference terminal of said dc supply,
(d) the base of said third transistor and collector of said second transistor are connected together and to said node through a fourth resistance, and
(e) the collector of said third transistor is connected through a low impedance path to said dc reference terminal.

12. A lighting unit as set forth in claim 11 wherein conduction by said SCR clamps the potential of said node and the base of said third transistor to near reference potential, which together with the connection of the emitter of said third transistor through said third resistance to said non-reference output terminal applies a reverse voltage across the input junction of said third transistor adequate to cause Zener breakdown of the junction at a predetermined voltage,
the potential of said other capacitor increasing the accumulated charge and decreasing the reverse bias of the input junction of said second transistor until this junction is forward-biased causing rapid increase of conduction by said hook connected transistor pair producing said turn-off of said first switching means and said initiation of said astable condition of said second switching means.

13. A lighting unit as set forth in claim 12 wherein
(a) said dc power source includes a diode bridge having ac input terminals and dc output terminals, and
(b) said source of charging potential is an input terminal of said bridge.

14. A lighting unit comprising:
A. a dc power source having two output terminals,
B. a metal vapor arc lamp requiring energization dependent on its electrical state, and
C. a lamp condition responsive operating network comprising:
(1) an incandescible resistive filament exhibiting a substantial resistance increase with applied voltage to provide standby light for said lamp,
(2) alternating electrical energy transforming means for coupling a stepped-up output voltage to said lamp,
(3) switching means, and
(4) interconnecting means for coupling current from said dc source,
(a) in a dc form to said filament for producing useful light, alternately with current in a periodic form to the input of said transforming means for staring said lamp, when said lamp is non-conductive,
(b) in a sustained periodic form to said filament for producing useful light and in a sustained periodic form to the input of said transforming means for transitioning said lamp, after lamp conduction until warm-up, and
(c) in a dc form to said filament and said lamp in series for energizing and ballasting said lamp during warm-up and normal running operation of said lamp, dissipation in said filament being too low to produce useful light, during normal running operation of said lamp.

15. A lighting unit as set forth in claim 14 wherein said dc current is provided to said filament for a relatively long period and, alternately, said periodic current is provided to the input of said transforming means for a relatively short period when said lamp is non-conductive.

16. A lighting unit as set forth in claim 15 wherein said switching means comprises:
A. a first switching means comprising a silicon controlled rectifier series connected with said filament across said output terminals, and
B. a second switching means comprising a transistor having a stable nonconducting first condition and an astable conducting-nonconducting second condition, and wherein
C. control means are provided when said first switching means is ON for precluding said astable condition of said second switching means, and when said first switching means is OFF, for permitting said astable condition of said second switching means.

17. A lighting unit as set forth in claim 16 wherein said control means causes said first switching means to be conductive before the astable condition of said second switching means in starting or restarting.

18. A lighting unit as set forth in claim 17 wherein said control means further comprsies
means responsive to conduction of said lamp for turning off said first switching means after lamp conduction has begun.

19. A lighting unit as set forth in claim 18 wherein said control means further comprises:
means responsive to the electrical condition of said lamp for maintaining said second switching means
in an astable condition during said OFF condition of said first switching means when said lamp is non-conductive;
in a sustained astable condition after lamp conduction until warm-up; and
in said stable condition during warm-up and normal running operation of said lamp.

* * * * *